K. A. PAULY.
INDUCTION MOTOR.
APPLICATION FILED MAR. 31, 1911.

1,067,270.

Patented July 15, 1913.

2 SHEETS—SHEET 1.

Witnesses:
Earl G. Klock.
J. Ellis Ela

Inventor:
Karl A. Pauly,
by
His Attorney.

UNITED STATES PATENT OFFICE.

KARL A. PAULY, OF SCHENECTADY, NEW YORK, ASSIGNOR TO GENERAL ELECTRIC COMPANY, A CORPORATION OF NEW YORK.

INDUCTION-MOTOR.

1,067,270.

Specification of Letters Patent.

Patented July 15, 1913.

Application filed March 31, 1911. Serial No. 618,179. REISSUED

*To all whom it may concern:*

Be it known that I, KARL A. PAULY, a citizen of the United States, residing at Schenectady, county of Schenectady, State of New York, have invented certain new and useful Improvements in Induction-Motors, of which the following is a specification.

My invention relates to variable speed induction motors, and its object is to provide a novel arrangement of rotor windings whereby the same rotor connections may be used with a starting resistance for operation on both speeds.

A two speed connection for the stator windings of induction motors is well known in the art, in which the relative direction of current flow is reversed in half the coils of each phase to vary the number of poles in the ratio of two to one. In such motors it has been customary heretofore either to employ a squirrel cage winding, which of course adapts itself to any number of poles, or, if a starting resistance is required for operation on both speeds, to provide a rotor with six collector rings. The reason for employing six collector rings is that with rotor windings as heretofore arranged in such motors, it is necessary to use a six phase rheostat, or to vary the connections of the rotor coils when changing from one speed to the other, since, if the rotor coils are properly connected for one number of poles, they will be non-inductive to the stator winding for the other number of poles.

By my invention I so arrange the rotor circuits that without any change in their connections they are in inductive relation to the stator winding for both sets of poles. I accomplish this by forming each phase of the rotor winding in a plurality of groups of coils connected in a plurality of circuits, each circuit comprising a plurality of groups displaced from each other so that their voltages are out of phase, the displacement being of such an amount that the sum of the induced voltages of the coil groups is greater than zero for both numbers of poles.

My invention will best be understood by reference to the accompanying drawings, in which—

Figure 1:
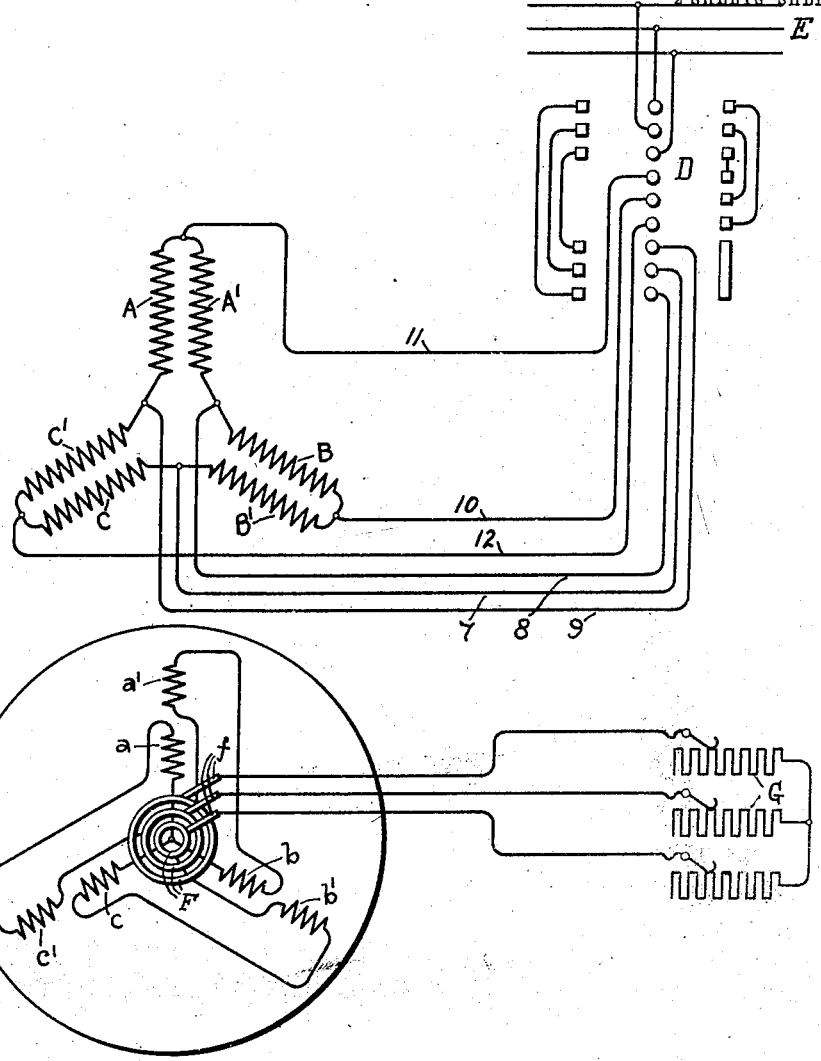
Figure 2:
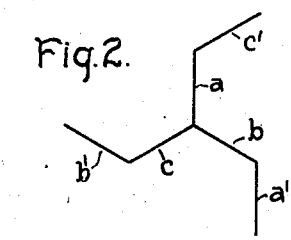
Figure 3:
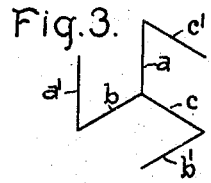
Figure 4:
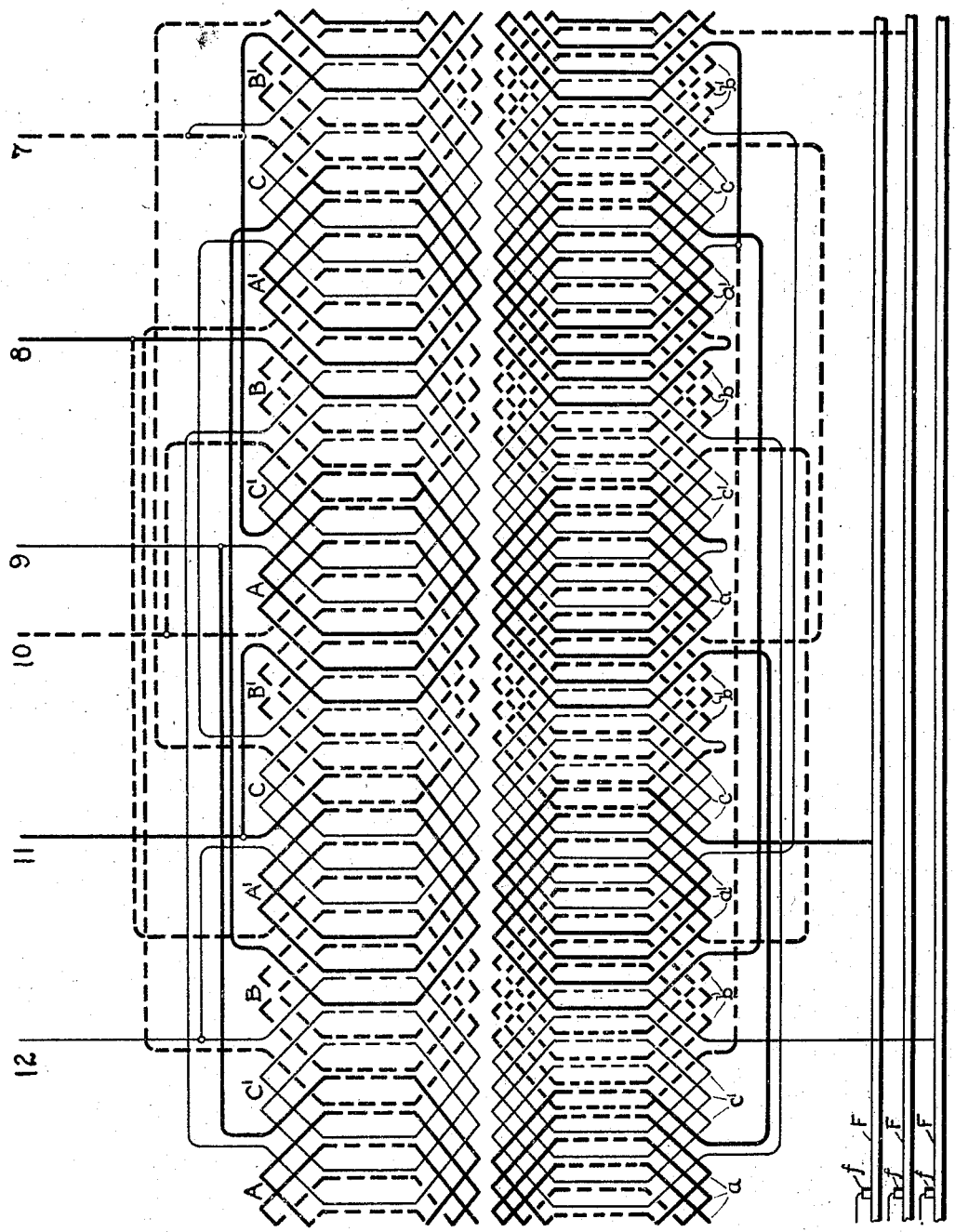

Figure 1 shows diagrammatically an induction motor arranged in accordance with my invention; Figs. 2 and 3 are explanatory diagrams; and Fig. 4 shows a development of the windings of a motor like that shown in Fig. 1.

In the drawing, A A', B B', and C C' represent the three phases of the stator winding of an induction motor, each phase consisting of two groups of coils, as A and A', from which connections are led to the control switch D which is shown diagrammatically with its contacts developed on a plane surface. This switch is arranged to vary the connections of the groups of coils so as to reverse the relative direction of current flowing in half the coils of each phase when the switch is thrown from one position to the other. Thus, when the switch D is moved to bring the left hand movable contacts in engagement with the stationary contact fingers, the source of current (indicated by the line wires E) is connected by means of the leads 7, 8 and 9 to the connections between the groups C and B', B and A', and A and C', the leads 10, 11 and 12 being open, the winding being thus connected in delta, so that the current passes through the two groups of each phase in series. When the switch D is thrown to bring the right hand movable contacts into engagement with the stationary contact fingers, the source of current is connected by means of the leads 10, 11 and 12 to the junction point of the two groups of each phase, the leads 7, 8 and 9 being connected together to form a neutral point for the winding. The current then in each phase flows from the junction point of the two groups through the two groups in parallel to the neutral. Thus, the relative directions of current in one half of each phase is reversed, and if the coils are properly connected in groups, the number of poles is thereby varied in the ratio of two to one, as is well understood in the art. In the upper part of Fig. 4 is shown the development of a primary winding for a four pole-eight pole motor having three coils per phase per pole. The rotor winding is also connected three phase, and each phase consists of two groups of coils. One phase consists of the coil groups $a$ and $a'$; the second of $b$ and $b'$; and the third of $c$ and $c'$. The displacement of these three phases is of the usual amount, and if the motor be considered as operating with the smaller number of poles, the displacement is then 120 electrical degrees. When the motor is operating with the larger number of poles, this makes the relative displacement 240 electrical degrees.

The rotor winding is connected in three circuits, each comprising groups of coils from two different phases. Thus, for instance, one circuit comprises the coils $a$ and $c'$; another $b$ and $a'$; and the third $c$ and $b'$. Furthermore, the two groups of coils in each circuit are reversely connected. The result of this connection on the voltages of the three circuits is indicated diagrammatically in Fig. 2, the coils $a$ and $c'$ being connected in series and their induced voltages being 120° out of phase their voltages add to each other at an angle of 60°, as shown. The same is true of each of the other circuits, so that the resultant voltages of the rotor circuits are nearly as great as though the coils of each phase were connected in series by themselves, in the usual manner.

The effect on the rotor voltages of varying the number of poles may be understood by comparing Fig. 3 with Fig. 2. Since with the smaller number of poles the voltages of coils $a$ and $b$ differ by 120°, they will now differ 240° with the larger number of poles, as is indicated by comparing these two figures. Similarly, if the difference between the coils $a$ and $c$ is 240° with the smaller number of poles, then with the larger number of poles they will differ 480°, or, what is the same thing 120°. Thus, comparing the lines, $a$, $b$, $c$ in Figs. 2 and 3, it will be seen that the lines representing coils $b$ and $c$ have simply changed places. Coils $c'$ being still in phase with coils $c$ and connected up as before, will have voltages induced in them in the same direction and will add their voltages to those of coils $a$ at an angle of 120°, as shown in Fig. 3. The net result, as shown by these two figures, is to give slightly different effective induced rotor voltages with different numbers of poles. As I have shown the connections, the effective induced rotor voltages are smaller with the large number of poles, but these voltages may be larger with the larger number of poles if desired by reversing the connections of the coils $a'$, $b'$, and $c'$.

Since the voltages in each circuit add to each other effectively for both numbers of poles, the terminals of the circuits may be connected permanently to three collector rings, as indicated at F in Fig. 1, and to these collector rings, by means of brushes $f$, a starting resistance G, may be connected, which may, therefore, be used with either number of poles. In the lower part of Fig. 4 is shown the development of a rotor winding having four coils per pole per phase, connected up as described above.

The principle on which my invention is based may be worked out through many different arrangements, and I do not desire to limit myself to the specific rotor connections which I have shown and described as one suitable embodiment of my invention, but I aim in the appended claims to cover all modifications which are within the scope of my invention.

What I claim as new and desire to secure by Letters Patent of the United States, is:—

1. In an induction motor, a stator winding having its coils connected in groups, connections for said groups for varying the relative connections of said groups to vary the number of poles in the stator winding, and a polyphase rotor winding, each phase of which comprises a plurality of groups of coils connected in a plurality of circuits, each of said circuits comprising a plurality of groups of coils in series displaced from each other so that their voltages are out of phase.

2. In an induction motor, a stator winding having the coils connected in groups, connections for said groups for varying the relative connections of said groups to vary the number of poles in the stator winding, and a polyphase rotor winding, each phase of which comprises a plurality of groups of coils connected in a plurality of circuits, each of said circuits comprising a plurality of groups of coils in series displaced from each other so that their voltages are out of phase, collector rings to which the terminals of the rotor circuits are connected, and a starting resistance connected to said collector rings.

3. In an induction motor, a stator winding having its coils connected in groups, connections for said groups for varying the relative connections of said groups to vary the number of poles in the stator winding, and a polyphase rotor winding, each phase of which comprises a plurality of groups of coils, each group is each phase being connected in a series circuit with a group in a different phase.

4. In an induction motor, a stator winding having its coils connected in groups, connections for said groups for varying the relative connections of said groups to vary the number of poles in the stator winding, and a polyphase rotor winding, each phase of which comprises a plurality of groups of coils connected in a plurality of circuits, each group in each phase being connected in a series circuit with a group in a different phase, collector rings to which the terminals of the rotor circuits are connected, and a resistance connected to said collector rings.

5. In an induction motor, a stator winding having coils connected in groups, connections for said groups for varying the relative connections of said groups to vary the number of poles in the stator winding, and a polyphase rotor winding having groups of coils in each phase connected in a plurality of circuits, each of said circuits comprising groups of coils having different phase relations with different numbers of poles in the stator winding.

6. In an induction motor, a three phase stator winding, connections for changing the speed of said motor by reversing the relative direction of current flowing in one half of each phase of the stator winding to vary the number of poles in the ratio of two to one, and a three phase rotor winding, the coils of the three phases being displaced from each other 120 electrical degrees for the smaller number of poles, and 240 electrical degrees for the larger number of poles, the coils being connected in three circuits, each circuit comprising coils of two phases, the coils of one phase being reversely connected relative to the coils of the other phase in the same circuit.

7. In an induction motor, a three phase stator winding, connections for changing the speed of said motor by reversing the relative direction of current flowing in one half of each phase of the stator winding to vary the number of poles in the ratio of two to one, and a three phase rotor winding, the coils of the three phases being displaced from each other 120 electrical degrees for the smaller number of poles, and 240 electrical degrees for the larger number of poles, the coils being connected in three circuits, each circuit comprising coils of two phases, the coils of one phase being reversely connected relative to the coils of the other phase in the same circuit, collector rings to which the terminals of the rotor circuits are connected, and a starting resistance connected to said collector rings.

8. In an induction motor, a stator winding having its coils connected in groups, connections for said groups for varying the relative connections of said groups to vary the number of poles in the stator winding, and a polyphase rotor winding, each phase of which comprises a plurality of groups of coils connected in a plurality of circuits, each of said circuits comprising a plurality of groups of coils in series displaced from each other so that their voltages are out of phase, the amount of such displacement being such that the voltages of the groups are more nearly in series than in opposition for one connection of the primary winding.

9. In an induction motor, a stator winding having its coils connected in groups, connections for said groups for varying the relative connections of said groups to vary the number of poles in the stator winding, a polyphase rotor winding, each phase of which comprises a plurality of groups of coils connected in a plurality of circuits, each of said circuits comprising a plurality of groups of coils in series displaced from each other so that their voltages are out of phase, the amount of such displacement being such that the voltages of the groups are more nearly in series than in opposition for one connection of the primary winding, collector rings to which the terminals of the rotor circuits are connected, and a starting resistance connected to said collector rings.

10. In an induction motor, a polyphase stator winding, connections for changing the speed of said motor by reversing the relative direction of current flowing in one half of each phase of the stator winding to vary the number of poles in the ratio of two to one, and a polyphase rotor winding having its coils connected in a plurality of circuits, each circuit comprising coils of two phases.

11. In an induction motor, a polyphase stator winding, connections for changing the speed of said motor by reversing the relative direction of current flowing in one half of each phase of the stator winding to vary the number of poles in the ratio of two to one, a polyphase rotor winding having its coils connected in a plurality of circuits, each circuit comprising coils of two phases, collector rings to which the terminals of the rotor circuits are connected, and a starting resistance connected to said collector rings.

12. In an induction motor, a polyphase stator winding, connections for changing the speed of said motor by reversing the relative direction of current flowing in one half of each phase of the stator winding to vary the number of poles in the ratio of two to one, and a rotor winding having its coils connected in a plurality of circuits, each circuit comprising coils of two phases, the coils of one phase being reversely connected relative to the coils of the other phase in the same circuit.

13. In an induction motor, a polyphase stator winding, connections for changing the speed of said motor by reversing the relative direction of current flowing in one half of each phase of the stator winding to vary the number of poles in the ratio of two to one, a rotor winding having its coils connected in a plurality of circuits, each circuit comprising coils of two phases, the coils of one phase being reversely connected relative to the coils of the other phase in the same circuit, collector rings to which the terminals of the rotor circuits are connected, and a starting resistance connected to said collector rings.

In witness whereof, I have hereunto set my hand this 30th day of March, 1911.

KARL A. PAULY.

Witnesses:
BENJAMIN B. HULL,
HELEN ORFORD.